June 6, 1967  M. S. ROSENBERGER ET AL  3,323,609
TRANSMISSION CONTROL LINKAGE
Filed July 22, 1965  2 Sheets-Sheet 1

INVENTORS
Maurice S. Rosenberger,
William H. Borman,
Paul J. King,
Richard A. LaFever, &
BY Wesley L. McCollum A. M. Neiter
ATTORNEY June 6, 1967 M. S. ROSENBERGER ETAL 3,323,609
TRANSMISSION CONTROL LINKAGE
Filed July 22, 1965 2 Sheets-Sheet 2

INVENTORS
Maurice S. Rosenberger,
William H. Boman,
Paul J. King,
Richard R. LaFever, &
BY Wesley L. McCollum

ATTORNEY

United States Patent Office 3,323,609
Patented June 6, 1967

3,323,609
TRANSMISSION CONTROL LINKAGE
Maurice S. Rosenberger and William H. Boman, Birmingham, Paul J. King, Orchard Lake, Richard A. La Fever, Birmingham, and Wesley L. McCollum, Milford, Mich., assignors to General Motors Corporation, Detroit, Mich., a corporation of Delaware
Filed July 22, 1965, Ser. No. 474,036
7 Claims. (Cl. 180—77)

This invention relates to a vhicle having a remotely controlled transmission and, more particularly, to a remote control linkage having a control lever supported on the vehicle floor.

It is conventional practice in vehicles having the transmission located at the rear of the vehicle to have a transmission control lever located forward in the driver's compartment and universally supported on the vehicle floor for pivotal movement about a stationary pivot point and connected by a single control rod to the cushioned transmission. With this arrangement, fore and aft control rod shake induced by the engine is transmitted to the lower and shorter lever arm end of the control lever, resulting in objectionable amplification of the shake at the operator-controlled upper and longer lever arm end.

The principle of this invention lies in a control lever mounted in a supported universal joint for universal movement about a pivot point which shifts along a predetermined path with a control rod connected and separately supported controlled device. As used in transmission controls, the control lever is mounted in a universal joint supported by the vehicle floor and has its lower end connected by the control rod to the rearwardly located transmission and connected engine cushioningly mounted on the vehicle frame. The control rod which extends longitudinally of the vehicle is supported in a tube for the rotatable and reciprocal movement imparted by the lever, which tube at its rearward end is connected to the transmission by linkage including an antinoise connection and at its forward end is connected to the universal support from below the floor by a bracket. Antifriction members sandwiching the vehicle floor between the universal support and bracket permit only fore and aft shake of the universal support transmitted by the tube, so that the universal support shifts in phase with longitudinal control rod shake and does not pivot fore and aft as a result of the shake.

An object of this invention is to provide a new and improved control linkage.

Another object of this invention is to provide in a remote control linkage, a control lever supported by a support for movement about a pivot point to control a control rod which pivot point shifts in phase with a remotely located and separately supported device being controlled by the control rod.

Another object of this invention is to provide in a control linkage, a pivoted connection which shifts along a predetermined path to prevent relative movement between the pivot and linkage in the direction of the path.

Another object of this invention is to provide in a vehicle having a rearwardly located and cushioned transmission and a forwardly located and floor mounted shift lever, a universal support for the shift lever connected to the transmission by a nonrotatable and longitudinally movable tube which supports the control rod connecting the shift lever and transmission and prevents relative movement between the universal support and control rod only on longitudinal control rod shake by causing conjoint movement of the universal support in a restricted and relatively friction-free path on the vehicle floor.

These and other objects of the invention will be more apparent from the following description and drawing of a preferred embodiment of the invention.

Figure 1:
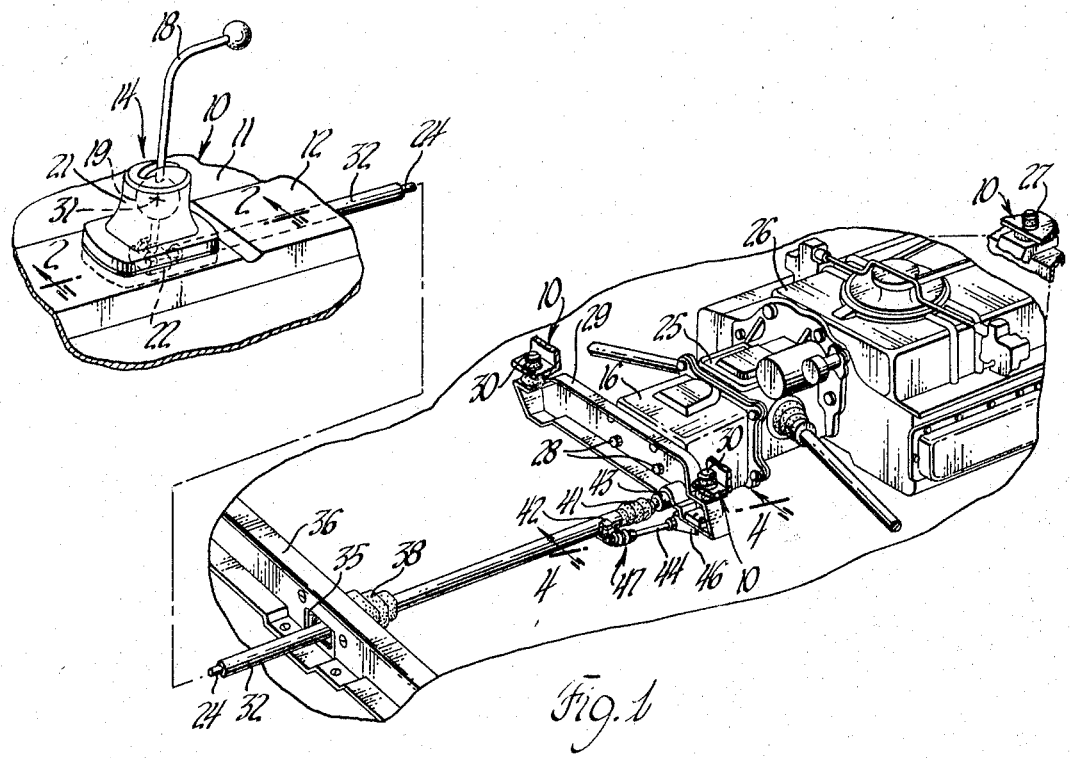
FIGURE 1 is a perspective view illustrating the complete transmission control linkage mounted in the vehicle.

The transmission control linkage made in accordance with this invention is primarily intended for use, as shown in FIGURE 1, in a vehicle body 10 having a unit body construction provided with a floor 11 having a raised central portion 12 which extends longitudinally in the vehicle from the driver's forwardly located compartment where the gear shifting mechanism 14 is positioned, to the rear of the vehicle adjacent the multiratio transmission 16. The gear shift or control lever 18 is mounted in a universal joint 19 in a floor mounted support of housing 21, has its lower lever arm end extending through floor aperture 20 and is connected at its lower end by a shifting pivotal connection 22 to a control rod 24 to operate the transmission. The complete details of the universal joint 19 and shifting pivotal connection 22 are shown in detail in United States patent application Ser. No. 399,058 filed Sept. 24, 1964, now Patent No. 3,264,-892 of William H. Boman and Charles E. Churchill, entitled, Transmission Control Linkage.

The transmission 16 is a part of the unitary assembly consisting of the transmission 16, a differential 25 and an engine 26, as shown in detail in United States Patent No. 3,101,010, issued Aug. 20, 1963, of George Popovich, entitled Drive Assembly. The unitary assembly is mounted on the vehicle body 10, as shown in detail in United States Patent No. 2,988,162, issued June 13, 1961, of Kai H. Hansen, entitled Motor Vehicle, which mounting has a single centrally located cushion mounting 27 for the rear of the assembly secured to the vehicle body 10. At the front, the transmission 16 and thus the entire unitary assembly is secured by bolts 28 connecting the transmission housing to a cross member 29, which member is secured by a pair of cushion mountings 30 to the vehicle body 10. This arrangement, which provides a three-point engine mounting, has a long longitudinal distance between the fore and aft motor mounts to obtain better vibration dampening for the unitary assembly, which includes the engine.

The gear shift lever 18, on pivoting in the fore and aft direction about the pivot point 31 provided by universal joint 19, imparts reciprocal movement to control rod 24 and on transverse movement about the pivot point imparts rotary movement to the control rod, the structure for supporting the forward end of control rod 24 for rotary and reciprocal movement being described in detail later. When the transmission 16 is like that shown in United States Patent No. 3,064,493, issued Nov. 20, 1962, of George Popovich and Virgil W. Owen, entitled, Transmission Control Linkage, selective operator movement of the shift lever provides for the establishment of three forward speeds and reverse through controlled rotary and longitudinal control rod movement.

Engine shake in the fore and aft direction transmitted through the transmission and by the control rod to the shift lever will be magnified at the handled upper end of the lever unless compensated for, recognizing that the lever arm between the lever fulcrum and the handle end is much greater than the lever arm measured to the pivotal connection with the control rod. This invention reduces the magnitude of fore and aft engine shake transmitted to lever 18 by causing the lever pivotal support and thus pivot point 31 to shake fore and aft with the transmission and connected engine. This maintains the relative position between the lever fulcrum of pivot point 31 and the unitary transmission differential and engine assembly, so that the control rod 24 does not pivot lever 18 fore and aft as a result of unitary assembly shake while at the same time permitting engine torsional vibration relative to the shift lever fulcrum.

Figure 2:
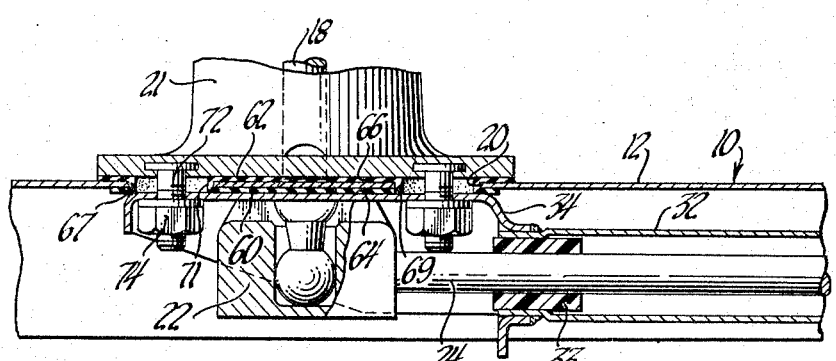
FIGURE 2 is a sectional view taken substantially on the line 2—2 in FIGURE 1 showing the universal support mounting.

This result is accomplished by the sleeve or tube 32 surrounding control rod 24 and having a nylon bushing 33 at its forward end for supporting the control rod for rotary and reciprocal control movement, see FIGURE 2. Tube 32 is welded at the forward end to a mounting bracket 34 located under the floor portion 12 and having a central opening through which the lower end of the shift lever extends. Bracket 34 is secured to the floor, as described in detail later, to hold the forward end of the tube and thus bushing 33 to provide the only support on the vehicle body for the control rod 24.

The tube 32 extends longitudinally of floor portion 12 and through an aperture 35 in a rear cross frame member 36, which member also provides a closure for the rear end of floor portion 12. A boot 38 provides a flexible seal between tube 32 and frame 36 and the tube continues to extend rearwardly, finally terminating at a point adjacent cross member 29. A second boot 41 seals the rearward end of tube 32 to the continuing extension of control rod 24, prior to the latter's connection to the internal transmission control rod, which connection includes a vibration damper 43 like that shown in detail in Patent No. 3,064,493.

Figure 4:
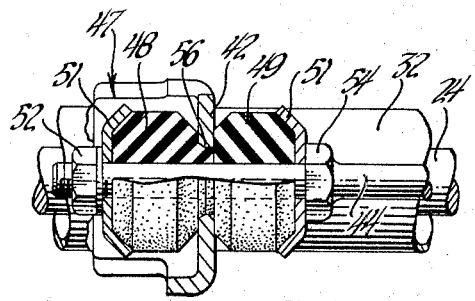
FIGURE 4 is a sectional view taken substantially on the line 4—4 in FIGURE 1, showing the tube and link connection.

The tube is connected to the unitary assembly by a bracket 42 welded to tube 32 at a point between boots 38 and 41 and nearer to the rearward tube end. A link 44 connects bracket 42 and connected tube 32 to the cross member 29 and connnected unitary assembly. Link 44 is rigidly connected at its rearward end to cross member 29 by bolted bracket 46. The other end of link 44, which is the forward end, is connected to bracket 42 by a noise isolation connection 47 which is best shown in FIGURE 4. This connection comprises a pair of hard rubber grommets 48 and 49 which are apertured to accommodate this end of the link. Link 44 extends through an accommodating aperture in bracket 42 and the grommets sandwich the bracket at their inner faces, their outer faces being engaged by identical washers 51 and the whole assembly being preloaded by nut 52 threaded on link 44 and acting on one washer with the other washer abutting a flat sided collar 54 formed on the link. Grommet 48 has a reduced diameter portion 56 fitting between link 44 and bracket 42, so that there is no metal to metal contact at this point either and fore and aft engine shake is transmitted without noise to the tube 32 as well as to the control rod 24.

Figure 3:
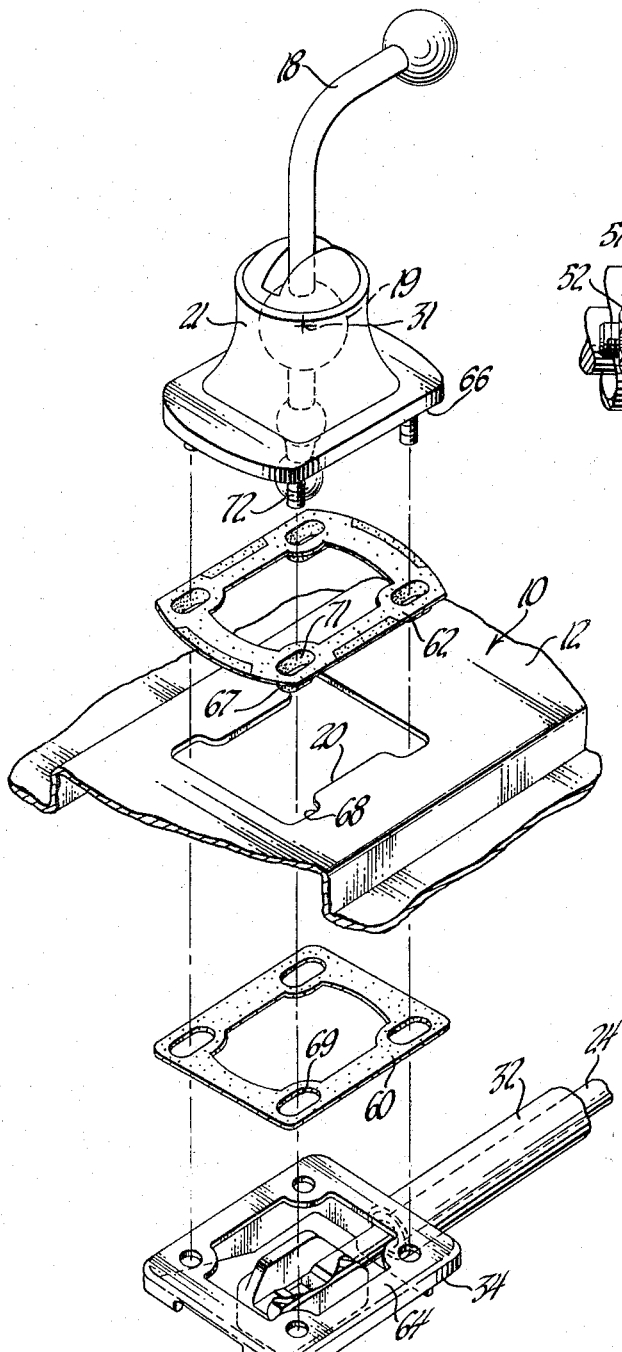
FIGURE 3 is an expanded view of the universal support mounting.

Fore and aft movement of the tube 32 and connected bracket 34 is transmitted to the universal support by provision of a lower, rectangular nylon member 60 and an upper, rectangular nylon member 62. These members sandwich the floor portion 12 between the flat rectangular bracket portion 64 of bracket 34 and the flat bottom surface 66 of housing 21 and have central openings aligned with the floor opening 20 to accommodate the lower end of lever 18. Upper member 62 has a depending boss 67 at each corner which engages the three sides of a pocket 68 in each corner of floor aperture 20 and also closely fits in an accommodating aperture 69 in the lower member 60 to prevent relative shifting between the members 60, 62 and floor portion 12. Each boss 67 has a slot 71 elongated in the fore and aft direction parallel to the control rod axis and receiving a bolt 72 cast in place in housing 21, which bolts have nuts 74 for securing the complete sandwiched assembly together while leaving a small clearance in the assembly for sliding movement relative to the flat antifriction surfaces provided by nylon members 60 and 62. The elongated slots 71 permit fore and aft movement of the bolts 72 and thus permit housing 21 and bolt connected tube bracket 34 to move fore and aft with reduced friction on the nylon members which they contact. FIGURE 3 is an expanded view of this assembly which is easily assembled.

Thus, when the shift lever 18 is in neutral or in a selected gear range and there occurs engine shake in the fore and aft direction, this fore and aft engine shake will be transmitted to shake or shift the control rod 24 along its axis which is always closely parallel to the longitudinal unitary assembly axis. This same fore and aft shake is at the same time transmitted to the shift lever's universal joint support 21. Since both the control rod 24 and the universal support 21 are shaking fore and aft conjointly, there is no relative movement between the control rod 24 and the shift lever pivot point 31 which would cause pivotal fore and aft shift lever movement as a result of the shake. Another structural feature of this invention is that fore and aft shake is transmitted by the tube 32 without noise because of the connection 47 which prevents metal to metal contact in the linkage connecting the tube to the transmission. In addition, the tube 32, by its nonrotatable connection to the floor portion 12 at its forward end and by its linkage connection by link 44 at its rearward end to the unitary assembly, acts as a torsion bar during vibrational movement of the unitary assembly about its longitudinal axis to provide additional spring support. Still another feature of this invention is that the universal support 21 is connected to the unitary assembly so that the shift lever fulcrum 31 does not rotate with the unitary assembly about the assembly's longitudinal axis to prevent torsional engine vibration from shaking the shift lever at its fulcrum.

The above described preferred embodiment is illustrative of the invention which, it will be appreciated, may be modified within the scope of the appended claims.

We claim:

1. In a control linkage, a base, a device to be controlled mounted on said base for relative movement, linkage means for controlling said device including a control rod operatively connected to control said device on reciprocal movement, a lever mounted by a pivotal joint on said base and having a lever arm operatively connected to said control rod to impart reciprocal movement to said control rod on pivotal movement of said lever and means operatively connecting said device to said pivot joint so that only movement of said device in a direction lengthwise of the control rod axis is imparted to said pivotal joint to prevent said control rod from pivoting said lever about said pivot joint on device movement lengthwise of the control rod axis.

2. In a vehicle having a body, a multiratio transmission supported on said vehicle body for relative movement, a support mounted on said vehicle body and having a pivotal joint, a control lever mounted in said pivotal joint, a control rod extending from said support to said transmission and operatively connected at one end to shift said transmission on reciprocal control rod movement, a tube surrounding said control rod and operatively connecting said support to the transmission housing, means connecting said control lever to the other control rod end to reciprocate the control rod on pivotal movement of said control lever and means for preventing movement of said support on said floor transverse of the control rod axis and for permitting movement of said support lengthwise of the control rod axis on movement of said transmission lengthwise of the control rod axis.

3. In a vehicle having a floor, a multiratio transmission located at the rear of the vehicle and supported for movement relative to said floor, a support mounted on said floor at the forward end of the vehicle and having a universal joint, a control lever mounted in said universal joint for universal pivotal movement and having a lower end extending below said floor, a control rod located below said floor and extending from said support to said transmission and operatively connected at one end to shift said transmission on selective rotary and reciprocal control rod movement, a tube surrounding said control rod and operatively connected at one end to said support and at the other end to the transmission housing and having an antifriction bearing at said one tube end supporting said control rod for rotary and reciprocal movement, means connecting said lower control lever end to the other control rod end to rotate and reciprocate said control rod on selective universal pivotal movement of said control lever and means for preventing movement of said support on said floor transverse of the control rod axis and for permitting movement of said support lengthwise of the control rod axis on movement of said transmission lengthwise of the control rod axis.

4. In a vehicle having a floor, a multiratio transmission located at the rear of the vehicle mounted on an antivibration support permitting damped movement about an axis and lengthwise movement relative to said axis, a lever support mounted on said floor at the forward end of said vehicle and having a universal joint, a shift lever mounted in said universal joint and having a lower end extending below said floor, a control rod extending from said lever support to said transmission and located at least closely parallel to said axis, a sleeve surrounding said control rod intermediate the ends of said control rod, means connecting said control rod to control said transmission on selective rotary and reciprocal control rod movement, means connecting said sleeve to said support, means connecting said lower shift lever end to said control rod to rotate and reciprocate said control rod on selective pivotal shift lever movement for changing the gear ratio of said multiratio transmission, means connecting said sleeve to the transmission housing so that said transmission will impart longitudinal movement to said sleeve in a direction lengthwise of said axis and means including antifriction means supporting said support and connected sleeve on said floor for permitting support movement lengthwise of said axis and preventing support movement transverse of said axis so that said control rod does not pivot said shift lever when said transmission moves lengthwise of said axis.

5. In a vehicle having a floor, a multiratio transmission located at the rear of the vehicle mounted on an antivibration support permitting damped movement about an axis and lengthwise movement relative to said axis, a lever support mounted on said floor at the forward end of said vehicle and having a universal joint, a shift lever mounted in said universal joint and having a lower end extending below said floor, a control rod extending from said lever support to said transmission and located at least closely parallel to said axis, a sleeve surrounding said control rod intermediate the ends of said control rod, means connecting one end of said control rod to control said transmission on selective rotary and reciprocal control rod movement, means connecting one end of said sleeve at a point adjacent the other control rod end to said support, said sleeve having an antifriction bearing adjacent said other control rod end for supporting said control rod for rotary and reciprocal movement, means connecting said lower shift lever end to said other control rod end to rotate and reciprocate said control rod on selective pivotal shift lever movement for changing the gear ratio of said multiratio transmission, linkage means including a noise isolation connection operatively connecting the other sleeve end to the transmission housing so that said transmission will impart longitudinal movement without noise to said sleeve in a direction lengthwise of said axis and means including antifriction means supporting said support and connected one sleeve end on said floor for permitting support movement lengthwise of said axis and preventing support movement transverse of said axis so that said control rod does not pivot said shift lever when said transmission moves lengthwise of said axis.

6. In a vehicle having a floor with an aperture, a multiratio transmission, cushion means mounting said transmission on said vehicle, a support located on said floor remotely from said transmission and having a universal joint, a control lever mounted in said universal joint and having a lower end extending through said aperture and below such floor, a control rod located below said floor and extending from said support to said transmission and connected at one end to change the gear ratio of said transmission on rotary and reciprocal control rod movement, a tube surrounding said control rod intermediate the ends of said control rod, means connecting said tube to said transmission so that movement of said transmission in a direction lengthwise of the control rod axis is transmitted to said tube, a bracket located below said floor and connected to said tube, fasteners connecting said bracket through said aperture to said support so that said support and said control tube are securely joined and retained on said floor, said tube having an internal bearing support for supporting the other control rod end for rotary and reciprocal movement, means connecting said lower lever end to said other control rod end to rotate and reciprocate said control rod on selective pivotal lever movement, a pair of antifriction members sandwiching said floor between said bracket and said support, said antifriction members operatively engaging said floor to prevent relative sliding movement between said antifriction members and said floor and one of said antifriction members having means for guiding said fasteners so that said support is prevented from movement transverse of the control rod axis and is permitted to move lengthwise of the control rod axis.

7. In a vehicle having a floor with an aperture, a multiratio transmission, cushion means mounting said transmission on said vehicle, a support located on said floor remotely from said transmission and having a universal joint, a control lever mounted in said universal joint and having a lower end extending through said aperture and below such floor, a control rod located below said floor and extending from said support to said transmission and connected at one end to change the gear ratio of said transmission on rotary and reciprocal control rod movement, a tube surrounding said control rod intermediate the ends of said control rod, linkage including a noise isolation connection connecting one tube end to said transmission so that movement of said transmission in a direction lengthwise of the control rod axis is transmitted to said tube, a bracket located below said floor and connected to the other tube end, bolts connecting said bracket through said aperture to said support so that said support and said control tube are securely joined to each other and both are retained on said floor, said tube having an internal bearing support for supporting the other control rod end for rotary and reciprocal movement, means connecting said lower lever end to said other control rod end to rotate and reciprocate said control rod on selective pivotal lever movement, a pair of antifriction members sandwiching said floor between said bracket and said support, one of said antifriction members having bosses interlocking both said antifriction members and engaging said floor in said aperture to prevent relative sliding movement between said antifriction members and said floor and said bosses having slots elongated in a direction parallel to the control rod axis and receiving said bolts so that said bracket and support are permitted to move only in a direction parallel to the control rod axis.

No references cited.

MILTON KAUFMAN, *Primary Examiner.*